United States Patent
Diethorn et al.

(10) Patent No.: US 8,208,617 B2
(45) Date of Patent: Jun. 26, 2012

(54) NOTIFYING A USER OF A TELECOMMUNICATIONS TERMINAL OF DISRUPTED AUDIO

(75) Inventors: Eric John Diethorn, Long Valley, NJ (US); Jay M. Stiles, Watchung, NJ (US); Heinz Teutsch, Green Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 507 days.

(21) Appl. No.: 12/471,587

(22) Filed: May 26, 2009

(65) Prior Publication Data

US 2010/0302049 A1      Dec. 2, 2010

(51) Int. Cl.
*H04M 3/42* (2006.01)

(52) U.S. Cl. ............ 379/202.01; 370/260; 709/204

(58) Field of Classification Search ......... 379/406.01, 379/406.02
See application file for complete search history.

(56) References Cited

U.S. PATENT DOCUMENTS

| | | | | |
|---|---|---|---|---|
| 5,771,440 | A * | 6/1998 | Sukhu et al. | 455/63.1 |
| 6,185,300 | B1 * | 2/2001 | Romesburg | 379/406.09 |
| 6,434,234 | B1 * | 8/2002 | Walker | 379/406.06 |
| 6,662,027 | B2 * | 12/2003 | Chia et al. | 455/570 |
| 6,707,811 | B2 * | 3/2004 | Greenberg et al. | 370/352 |
| 2006/0221876 | A1 * | 10/2006 | Kosanovic et al. | 370/286 |

* cited by examiner

*Primary Examiner* — Creighton Smith
(74) *Attorney, Agent, or Firm* — Maldjian Law Group LLC; John P. Maldjian, Esq.; Alexander D. Walter, Esq.

(57) ABSTRACT

A user of a telecommunications terminal is made aware when the user's voice is disrupted by echo suppression, which notifies the user that he or she can adjust his or her speaking pattern, or move closer to the microphone in order to stop the clipping.

14 Claims, 3 Drawing Sheets

NOTIFYING A USER OF A TELECOMMUNICATIONS TERMINAL OF DISRUPTED AUDIO

FIELD OF THE INVENTION

The present invention relates to telecommunications in general, and, more particularly, to telephone receiver interfaces.

BACKGROUND OF THE INVENTION

When a telecommunications terminal is used in speakerphone mode, acoustic echo or "feedback" between the loudspeaker and the microphone of the telecommunications terminal is likely to occur. When acoustic echo occurs, sound produced by the loudspeaker is sensed by the microphone and retransmitted back to its original source, causing undesirable artifacts, such as echo, to be heard.

In accordance with acoustic echo canceling, a digital-adaptive filter models the acoustic coupling between loudspeakers and the microphone of a telephone receiver (i.e., the "acoustic signature") in the room. The audio signal that feeds the local loudspeaker is filtered using the acoustic signature stored in the adaptive filter model. This filtered signal is then subtracted from the microphone signal before the signal is transmitted to the far end, resulting in an improved signal under some conditions. However, acoustic echo canceling has some limitations. First, the adaptive filter might take several seconds to adapt to changes in the acoustic signature of the room. Second, adaptation can only occur when the far-end party is talking but the local parties are not. As a result, if changes to the room's acoustic signature occur during a conversation—for example, the microphone moves or a local party's body moves with respect to the local microphones—then the far-end party will hear the artifacts of inadequate cancellation until the digital filter can re-adapt.

Acoustic echo suppression is used to supplement the acoustic echo canceling when it is determined that the echo canceling is not sufficient to prevent acoustic echo. Acoustic echo suppression involves the insertion of mild attenuation in the microphone signal in order to prevent remaining echo signal from being transmitted. When echo suppression is used, the users of the telecommunications terminal often experience a "half-duplex" effect, where the speech of the speakerphone user is clipped or suppressed as a result of the echo suppression. When such clipping or suppression occurs, its cause is not readily apparent to the user of the telecommunications terminal, leading the user to become frustrated as he or she does not know when his or her speech is heard by the far-end participant nor does he or she know how to react in order to stop the voice clipping.

SUMMARY OF THE INVENTION

However, if the user of a telecommunications terminal is made aware when the user's voice is disrupted by echo suppression, the user can adjust his or her speaking pattern, or move closer to the microphone in order to stop the clipping. Therefore a need exists for a method for informing the users of telecommunications terminals when their voices are disrupted by the echo suppression of their terminal.

The present invention answers this need by providing a method for displaying an indication when the voice of a user of a telecommunications terminal is likely to be disrupted. Some embodiments of the present invention display an indication of the probability that the voice of the user is going to be disrupted, while others display an indication of the amount of echo suppression applied. The following disclosure teaches examples of the embodiments and their operation.

DETAILED DESCRIPTION

For the purposes of this disclosure, the term "disrupted," and its inflected forms, is defined as clipped, suppressed, distorted, attenuated, or impaired.

Figure 1:
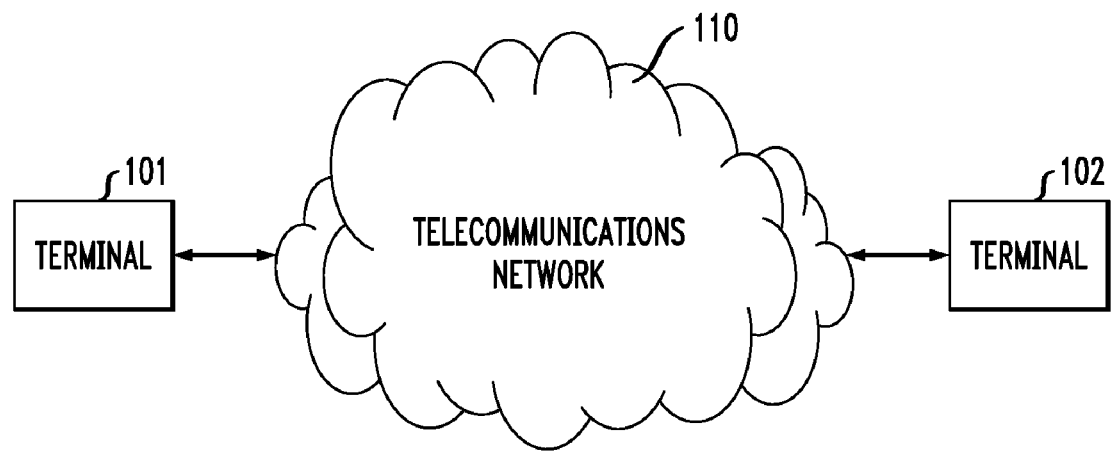
FIG. 1 depicts a schematic diagram of the salient components of the illustrative embodiment of the present invention.

FIG. 1 depicts a schematic diagram of the salient components of the illustrative embodiment of the present invention. The illustrative embodiment comprises telecommunication terminals 101 and 102 and telecommunications network 110.

Telecommunications terminal 101 is a desk-set telephone receiver capable of operating in speakerphone mode. It will be clear to those skilled in the art, after reading this disclosure, how to make and use alternative embodiments of the present invention in which telecommunications terminal 101 is any type of communication device, such as, and without limitation, mobile telephone, two-way radio, and so forth.

Telecommunications terminal 102 is a desk-set telephone receiver capable of operating in speakerphone mode. It will be clear to those skilled in the art, after reading this disclosure, how to make and use alternative embodiments of the present invention in which telecommunications terminal 101 is any type of communication device, such as, and without limitation, mobile telephone, two-way radio, and so forth.

Telecommunications network 110 is used to transport signals between telecommunications terminal 101 and 102. In accordance with the illustrative embodiment, telecommunications network 100 is the Public Switched Telephone Network, but it will be clear to those skilled in the art how to make and use alternative embodiments of the present invention in which telecommunications network 100 is another type of network, such as for example, and without limitation, the Internet.

Figure 2:
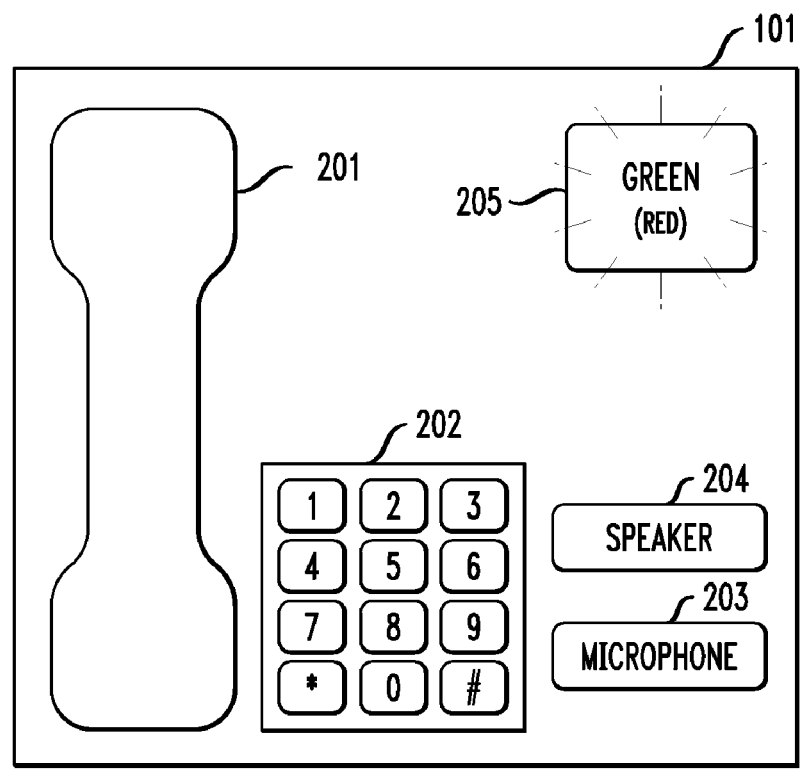
FIG. 2 depicts a schematic diagram of the salient components of telecommunications terminal 101.

FIG. 2 depicts a schematic diagram of the salient components of telecommunications terminal 101. Telecommunications terminal 101 comprises headset 201, button pad 202, microphone 203, loudspeaker 204, and display 205.

Headset 201 is a telephone headset. It will be clear to those skilled in the art how to make and use headset 201.

Button pad 202 is a telephone button pad. It will be clear to those skilled in the art how to make and use button pad 202.

Microphone 203 is an electro-acoustical transducer. Microphone 203 receives sounds from one or more telephone call participants and converts the sounds to electrical signals. It will be clear to those skilled in the art how to make and use microphone 203.

Loudspeaker 204 is an electro-acoustical transducer that converts electrical signals to sound. It will be clear to those skilled in the art how to make and use loudspeaker 204.

Display 205 is a light emitting diode (LED) that is set to emit red light when the amount of echo suppression inserted by telecommunications terminal 101 exceeds a predetermined threshold. In a similar fashion, display 205 is set to emit green light when the amount of echo suppression is below the predetermined threshold. It will be clear to those skilled in the art, after reading this disclosure, how to make and use alternative embodiments of the present invention in which display 205 is a loudspeaker, liquid crystal display, dial gauge, digital gauge, vibration device, etc. And still furthermore, it will be clear to those skilled in the art that, after reading this disclosure, the indication that the voice of user 301 is disrupted is displayed in a variety of ways, such as, and without limitation, by moving the needle on a gauge, by playing a sound, by triggering a tactile stimulus, such as vibration, and others.

Although, in the illustrative embodiment, display 205 can have two possible states—green or red, it will be clear to those skilled in the art how to make and use alternative embodiments of the present invention in which display 205 has a much larger number of states. Those skilled the in the art would recognize, that alternative embodiments can be devised in which, for example, display 205 is a liquid crystal display (LCD) capable of displaying ten-digit decimal numbers, a speaker capable of reproducing any sound pitch in the range 20 Hz to 20 kHz, etc.

Figure 3:
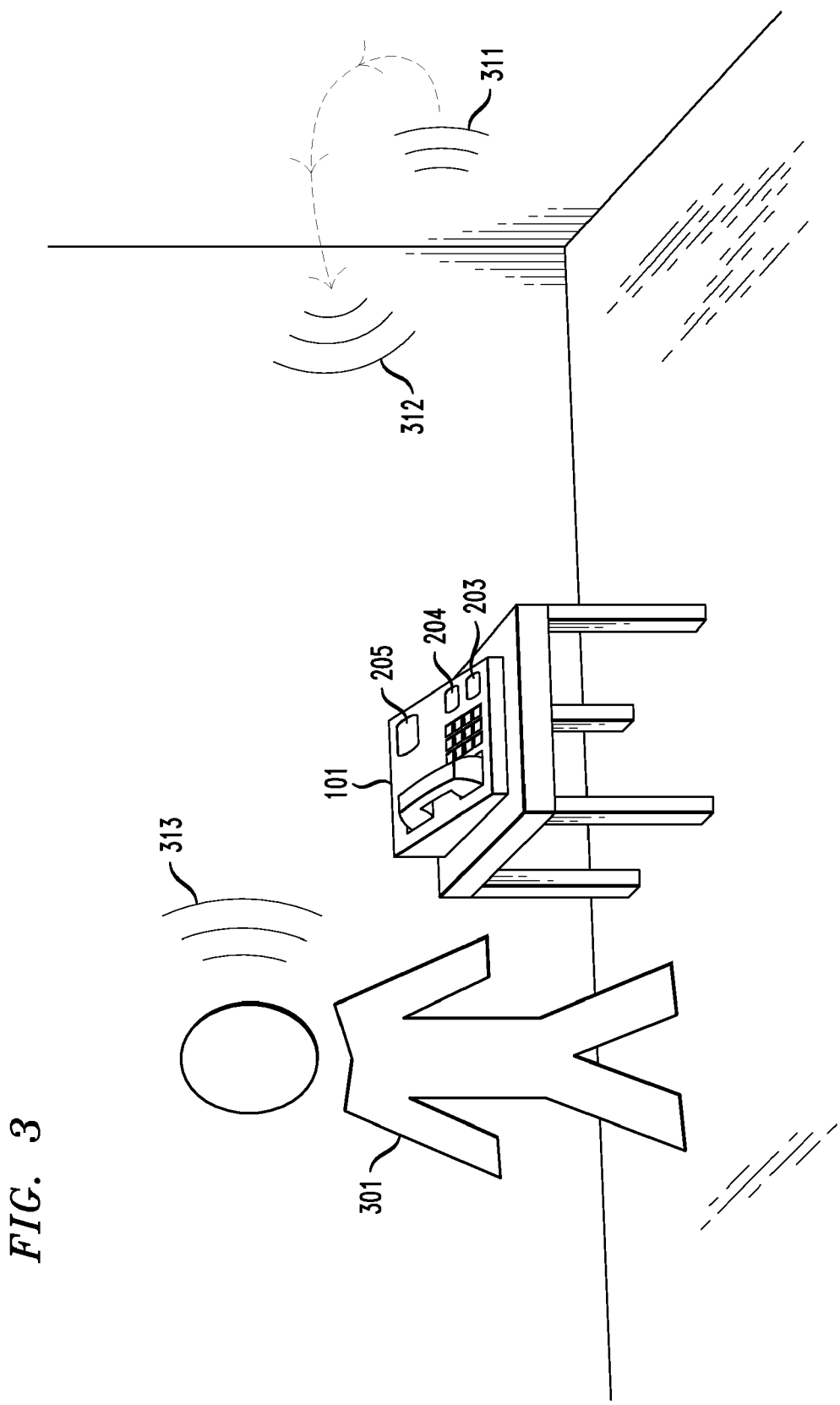
FIG. 3 depicts a schematic diagram of the salient components of the illustrative embodiment of the present invention.

FIG. 3 depicts a schematic diagram of the salient components of the illustrative embodiment of the present invention. It comprises loudspeaker signal 311, echo signal 312, voice signal 313, and user 301.

User 301 is a natural person using telecommunications terminal 101. User 301 is acoustically co-located with terminal 101.

Loudspeaker signal 311 is acoustic signal produced by loudspeaker 204. Loudspeaker signal 311 deflects from the walls in the room where telecommunications terminal 101 is located and returns towards the terminal as echo signal 312.

Echo signal 312 is the acoustic reflection of sound produced by loudspeaker 204 from the walls in the room where the telecommunications terminal is located.

Voice signal 313 is acoustic signal produced by user 301. Voice signal 302 carries the speech of user 301.

Figure 4:
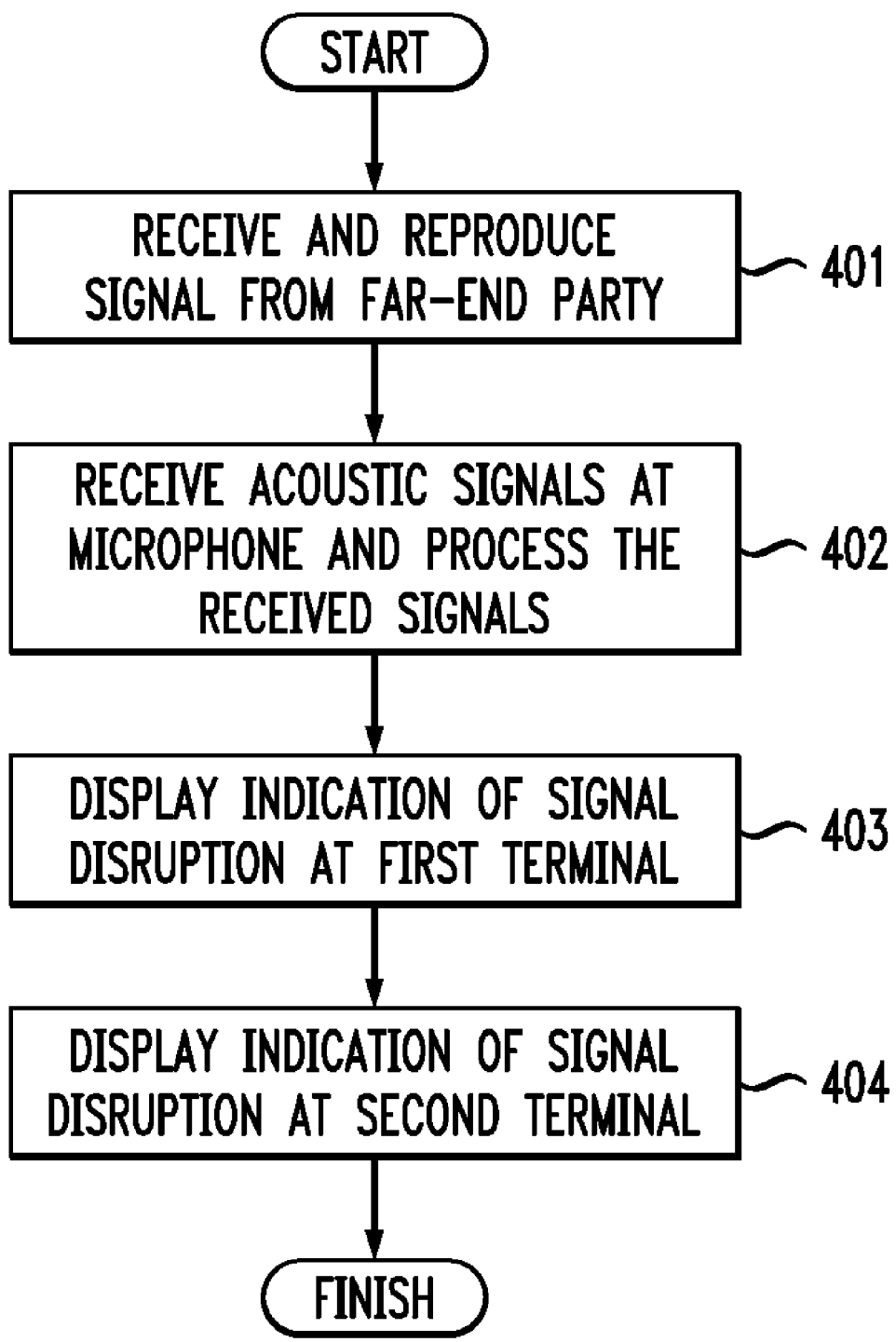
FIG. 4 depicts a flowchart of the salient tasks associated with the operation of an illustrative embodiment of the present invention as performed by telecommunications terminal 101.

FIG. 4 depicts a flowchart of the salient tasks associated with the operation of the illustrative embodiment of the present invention. It will be clear to those skilled in the art, after reading this disclosure, how to perform the tasks associated with FIG. 4 in a different order than represented or to perform the tasks simultaneously.

At task 401, telecommunications terminal 101 receives signal from telecommunications terminal 102 and reproduces it through loudspeaker 204 as loudspeaker signal 311. Loudspeaker signal 311 deflects from the walls in the room, where telecommunications terminal 101 is located, and returns to telecommunications terminal 101 as echo signal 312.

At task 402, telecommunications terminal 101 senses echo signal 312 and voice signal 313 with microphone 203, and performs echo suppression to attenuate the echo signal in a well-known fashion.

At task 403, telecommunications terminal 101 uses display 205 to display an indication that the voice of user 301 is disrupted. In the illustrative embodiment, display 205 is set to emit red light when the "echo return loss enhancement" (ERLE) of the echo cancelation falls below a predefined threshold. The threshold is 30 db, but it will be clear to those skilled in the art, after reading this disclosure, how to make and use alternative embodiments of the present invention in which the threshold has another value, such as, and without limitation, 10 dB, 20 dB, etc. When ERLE is poor, indicating the adaptive filter echo canceller is not sufficiently canceling echo, greater amounts of echo suppression are required to attenuate the echo residual otherwise transmitted to the far-end party; and, with greater amounts of suppression comes a higher likelihood of clipping the speakerphone user's speech.

In accordance with the illustrative embodiment, an indication of the relation between the echo return loss enhancement (ERLE) of the echo cancelation and a predefined threshold is displayed. However, it will be clear to those skilled in the art, after reading this disclosure, how to make and use alternative embodiments of the present invention in which a number N is displayed, wherein N is the magnitude of the echo return loss enhancement (ERLE), or a number that bears any mathematical relationship to the magnitude of the echo return loss enhancement (ERLE), such as linear, logarithmical, exponential, etc. It will also be clear to those skilled in the art, after reading this disclosure, that the value displayed by display 205 can be based on any other metric correlated with the amount of echo suppression inserted by telecommunications terminal 101, such as, and without limitation, the power envelope of the incoming signal, the volume settings of loudspeaker 204, "echo return loss" (ERL), etc.

At task 404 telecommunications terminal 102 determines the value of an indication of echo suppression inserted at telecommunications terminal 101. In accordance with the illustrative embodiment, terminal 102 receives the value displayed by display 205 and reproduces it. However, it will be clear to those skilled in the art, how to make and use alternative embodiments of the present invention in which terminal 102 receives an indication of one or more metrics correlated with the amount of suppression applied by telecommunications terminal 101, and determines independently whether to display an indication to the near-end party that the voice of user 301 is disrupted by telecommunications terminal 101— in which case, task 404 becomes identical to task 403.

It is to be understood that the disclosure teaches just examples of the illustrative embodiments and that many variations of the invention can easily be devised by those skilled in the art after reading this disclosure and that the scope of the present invention is to be determined by the following claims.

What is claimed is:

1. A method comprising:
   displaying to a user of a first telecommunications terminal an indication of the amount of echo suppression that is applied to a call involving the first telecommunications terminal; and
   receiving at a second telecommunications terminal the indication of the amount of echo suppression.

2. A method comprising:
   displaying to a user of a first telecommunications terminal an indication of the amount of echo suppression that is applied to a call involving the first telecommunications terminal; and
   displaying to a user of a second telecommunications terminal an indication of the amount of echo suppression that is applied to the call.

3. The method of claim 1 wherein the indication depends on the power envelope of the incoming signal at the telecommunications terminal.

4. The method of claim 1 wherein the indication depends on a volume control setting of the loudspeaker of the telecommunications terminal.

5. The method of claim 1 wherein the indication depends on the echo return loss enhancement of the signal.

6. The method of claim 1 wherein the indication depends on the echo return loss of the signal.

7. The method of claim 1 wherein the indication depends on the amount of echo suppression inserted by the telecommunications terminal.

8. A method comprising displaying to a user of a first telecommunications terminal an indication of a likelihood that the reception of a sound transmitted from the first telecommunications terminal will be disrupted.

9. The method of claim 8 wherein the indication depends on the power envelope of the incoming signal at the telecommunications terminal.

10. The method of claim 8 wherein the indication depends on a volume control setting of the loudspeaker of the telecommunications terminal.

11. The method of claim 8 wherein the indication depends on the Echo Return Loss Enhancement of the signal.

12. The method of claim 8 wherein the indication depends on the Echo Return Loss of the signal.

13. The method of claim 8 wherein the indication depends on the amount of echo suppression inserted by the telecommunications terminal.

14. The method of claim 8 wherein the indication is displayed to a second user.

* * * * *